US006991822B2

(12) United States Patent
Hill et al.

(10) Patent No.: US 6,991,822 B2
(45) Date of Patent: Jan. 31, 2006

(54) APPARATUS AND METHOD FOR MOVING A WORKPIECE THROUGH AN OPENING IN A CONTAINER

(75) Inventors: Brian Hill, Northbrook, IL (US); Hector Chavez, Skokie, IL (US)

(73) Assignee: Brian Hill, Long Grove, IL (US)

( * ) Notice: Subject to any disclaimer, the term of this patent is extended or adjusted under 35 U.S.C. 154(b) by 113 days.

(21) Appl. No.: 10/454,958

(22) Filed: Jun. 5, 2003

(65) Prior Publication Data

US 2003/0211211 A1 Nov. 13, 2003

Related U.S. Application Data

(63) Continuation of application No. 10/044,623, filed on Oct. 23, 2001, now abandoned, which is a continuation of application No. 09/543,426, filed on Apr. 5, 2000, now abandoned.

(51) Int. Cl.
*A23L 2/52* (2006.01)

(52) U.S. Cl. ...................... 426/397; 426/590; 426/592; 426/616

(58) Field of Classification Search ................ 426/104, 426/115, 389, 392, 397, 616, 590, 592; 99/275, 99/485, 494; 100/59, 227, 71, 94, 102, 213; 222/36, 37, 41, 460, 63, 66, 461; 215/386, 215/390, 355, 358–362; 42/90; 86/29–30; 53/287, 515, 435, 473, 474, 50, 235, 238–239, 53/252, 255, 257, 258

See application file for complete search history.

(56) References Cited

U.S. PATENT DOCUMENTS

| | | | |
|---|---|---|---|
| 1,565 | A | 4/1840 | Clark |
| 35,325 | A | 5/1862 | Redlich |
| 170,574 | A | 11/1875 | Little |
| 194,457 | A | 8/1877 | Newsam |
| 203,221 | A | 4/1878 | Veronee |
| 580,545 | A | 4/1897 | Bruner |
| 797,753 | A | 8/1905 | Roth |
| 956,369 | A | 4/1910 | Kohler |
| 1,402,713 | A | 1/1922 | Brandstetter |

(Continued)

FOREIGN PATENT DOCUMENTS

FR 345681 12/1904

(Continued)

OTHER PUBLICATIONS

Marty Nachel & Steve Ettlinger, Beer for Dummies, 1996, IDG Books Worldwide, p. 74.*

*Primary Examiner*—Drew Becker
(74) *Attorney, Agent, or Firm*—Fitch, Even, Tabin & Flannery

(57) ABSTRACT

An apparatus and method for narrowing and moving a workpiece from a fruit or vegetable through an opening in a container wherein the workpiece is relatively wider than the opening is provided. The apparatus has a plunger with an extension portion slidably movable within a bore formed in a loader. The loader has a base portion mountable over the opening. In one preferred embodiment of this invention, the apparatus includes a compression plate for compressing the fruit or vegetable into a slicer, forming a plurality of workpieces. The slicer, holding the workpieces, is aligned with the plunger and one workpiece is plunged through a first bore and into a container.

29 Claims, 8 Drawing Sheets

U.S. PATENT DOCUMENTS

| | | | |
|---|---|---|---|
| 1,759,357 A | | 5/1930 | Lacey |
| 1,818,848 A | | 8/1931 | Gutzke |
| 1,858,435 A | | 5/1932 | Conlon |
| 1,898,588 A | | 2/1933 | Metzger |
| 1,996,970 A | | 4/1935 | Morris |
| 2,412,089 A | | 12/1946 | Kelly |
| 2,589,724 A | | 3/1952 | Miller |
| 3,030,748 A | | 4/1962 | Moses |
| 3,227,069 A | | 1/1966 | Mouton |
| 3,480,982 A | | 12/1969 | Suanders |
| 3,747,252 A | | 7/1973 | Walker |
| 3,780,735 A | | 12/1973 | Crouter et al. |
| 3,830,151 A | | 8/1974 | Gerson |
| 4,025,032 A | | 5/1977 | O'Neil et al. |
| 4,060,083 A | | 11/1977 | Hanson |
| 4,152,858 A | | 5/1979 | Dobbs |
| 4,374,464 A | | 2/1983 | Tillander |
| 4,436,025 A | | 3/1984 | Jones |
| 4,537,017 A | | 8/1985 | Hengstenberg et al. |
| 4,611,457 A | | 9/1986 | Bittner |
| 4,738,195 A | | 4/1988 | Berube et al. |
| 4,809,484 A | | 3/1989 | Lovik |
| 4,963,377 A | * | 10/1990 | Rimmeir ..................... 426/283 |
| 4,974,357 A | | 12/1990 | Jones et al. |
| 5,337,480 A | | 8/1994 | Codikow |
| 5,520,105 A | | 5/1996 | Healy |
| 5,671,659 A | | 9/1997 | Swindle |
| 5,709,066 A | | 1/1998 | Prochaska et al. |
| 6,389,783 B1 | | 5/2002 | Segal |
| 6,568,155 B2 | | 5/2003 | Segal |
| 2002/0035823 A1 | | 3/2002 | Segal |

FOREIGN PATENT DOCUMENTS

| | | |
|---|---|---|
| FR | 2814356 | 9/2001 |
| GB | 259827 | 10/1926 |
| GB | 2368004 | 9/2001 |

* cited by examiner

APPARATUS AND METHOD FOR MOVING A WORKPIECE THROUGH AN OPENING IN A CONTAINER

CROSS-REFERENCE TO RELATED APPLICATIONS

This application is a continuation of U.S. patent application Ser. No. 10/044,623, filed Oct. 23, 2001, now abandoned, which is a continuation of U.S. patent application Ser. No. 09/543,426, filed Apr. 5, 2000, now abandoned, which are hereby incorporated herein by reference in their entirety.

FIELD OF THE INVENTION

The present invention is directed to an apparatus for moving a relatively wider workpiece through an opening in a container. More specifically, the present invention is directed to an apparatus for moving a segment of fruit, for example a wedge of lime, through an opening in a beverage bottle.

BACKGROUND OF THE INVENTION

Many people accentuate the flavor of a beverage they are about to enjoy with a slice or wedge of a citrus fruit, for example a slice of lemon or a wedge of lime. However, the slice or wedge is often too wide to easily fit into the beverage bottle making the process difficult and messy.

There are several devices known to those skilled in the art for subdividing a fruit or vegetable into segments. These devices have a plunger assembly whereby the workpiece is manually forced through a plurality of blades, which divide the workpiece into sections.

One shortcoming of these devices is that after the workpiece is divided into sections, the sections are not retained or compartmentalized within the device and are allowed to fall into a bowl placed below the device. Further, these devices do not move the relatively wider cut sections through an opening in a container, for example an opening in a beverage bottle.

There is thus a need or desire for an apparatus and method for easily moving a relatively wider workpiece through an opening in a container.

SUMMARY OF THE INVENTION

The present invention is directed to an apparatus for moving a relatively wider workpiece through an opening in a container, for example moving a segment of a lime through an opening in a beverage bottle.

The apparatus has a loader with a base portion that is mountable over the opening in the container. The loader forms a tapered bore which extends through at least a portion of the loader.

A plunger having a tapered extension portion is slidably movable within the bore. A workpiece is positioned within the bore and the plunger is then slidably moveable within the bore so that the extension portion contacts the workpiece and the workpiece is plunged through the bore and through the opening in the container. The extension portion extends beyond the bore and into the opening in the container to ensure that the workpiece is moved through the opening and into the container, preventing the opening from being closed or blocked by the workpiece. As the workpiece is plunged through the tapered bore, the workpiece is gradually compressed between the extension portion and the bore, thereby narrowing the size of the workpiece and allowing it to move through the opening.

The plunger has a guide that extends around a periphery of the loader to align the extension portion with the bore as the workpiece is plunged through the bore and the opening. The loader and the plunger can be positioned together to form a bottle-shaped apparatus.

A method for preparing and moving a relatively wider workpiece through an opening in a container is also provided. The workpiece is aligned between the plunger and the first bore. With the workpiece aligned with the first bore, the plunger is moved towards the support plate so that the plunger head contacts the workpiece. As the plunger continues to move in a downward direction, the workpiece is moved by the plunger head out of the section and into the first bore.

As the workpiece is plunged through the first bore, the workpiece is compressively narrowed. The workpiece continues to narrow and move through the first bore and into the opening formed in the container. The plunger head protrudes into the opening formed by the neck portion of the container to ensure that the workpiece does not get stuck within the neck portion of the container.

With the foregoing in mind, it is a feature and advantage of the invention to provide an apparatus for narrowing and moving a relatively wider workpiece through an opening in a container, for example plunging a segment of lime into a beverage bottle.

It is also a feature and advantage of the invention to provide an apparatus and method for cutting a fruit into a plurality of workpieces and moving each workpiece individually through an opening in one or more containers.

The foregoing and other features and advantages will become further apparent from the following detailed description of the preferred embodiments, read in conjunction with the drawings. The detailed description and drawings are intended to be illustrative rather than limiting, the scope of the invention being defined by the appended claims and equivalents thereof.

DETAILED DESCRIPTION OF THE PREFERRED EMBODIMENTS

Figure 1:
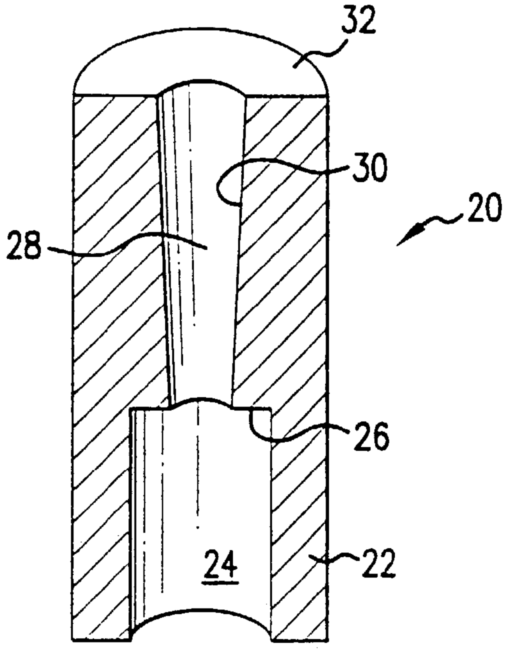
FIG. 1 is a perspective cross-sectional view of a loader, according to one preferred embodiment of this invention.
Figure 2:
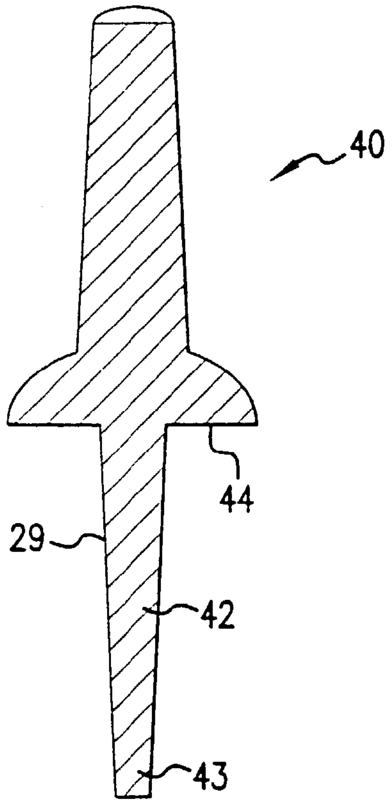
FIG. 2 is a perspective cross-sectional view of a plunger, according to one preferred embodiment of this invention.
Figure 3:
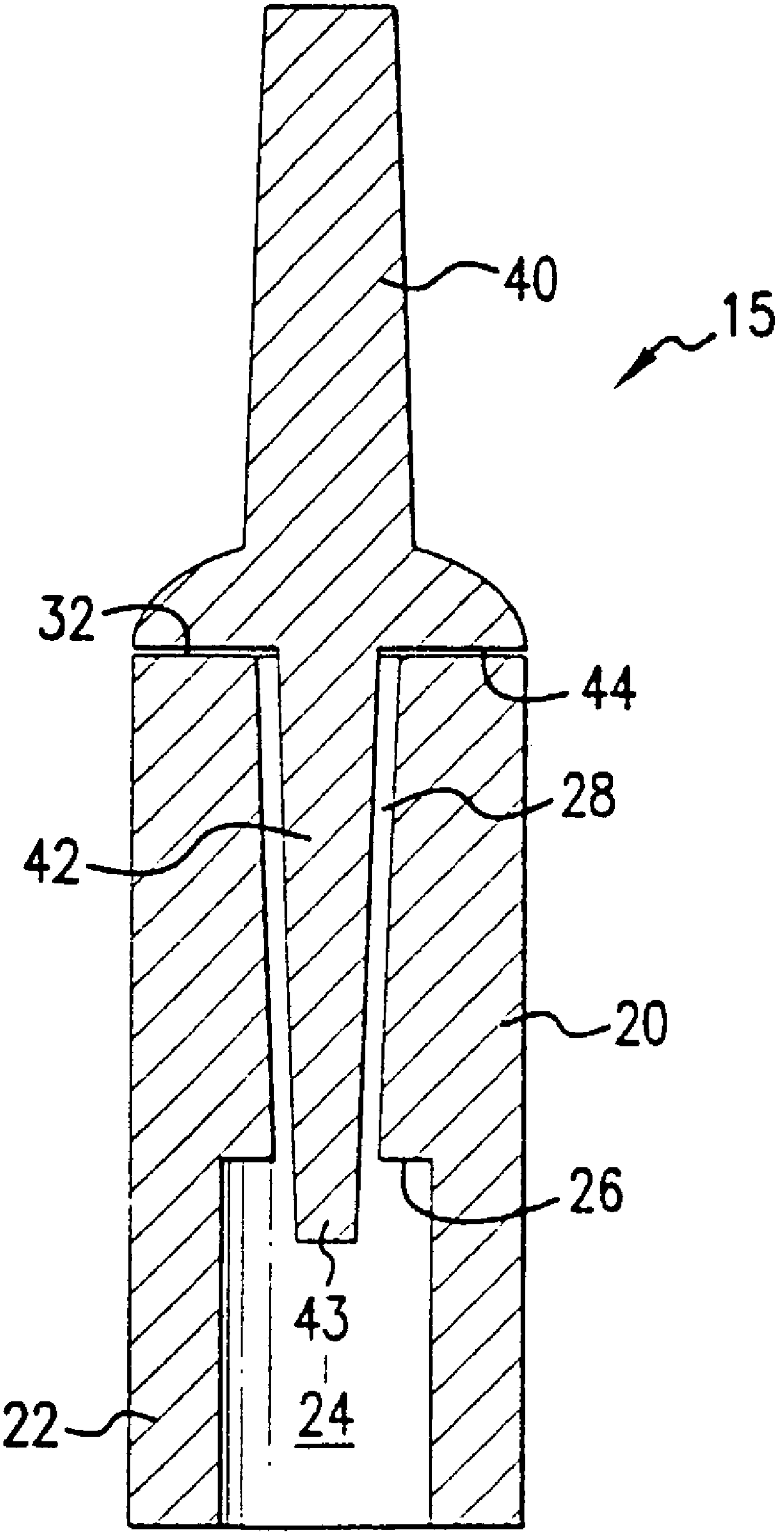
FIG. 3 is a front cross-sectional view of an apparatus, according to one preferred embodiment of this invention.
Figure 4:
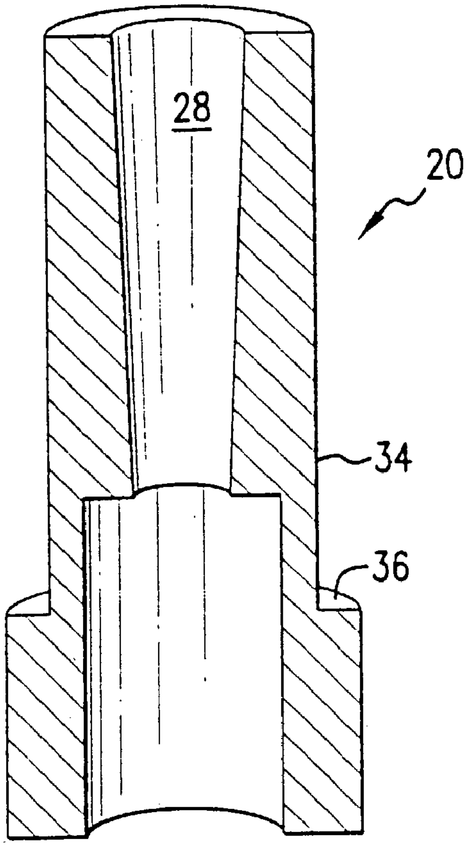
FIG. 4 is a perspective cross-sectional view of a loader, according to one preferred embodiment of this invention.

FIGS. 1–3 show an apparatus 15, according to one preferred embodiment of this invention, for narrowing and moving a workpiece through an opening in a container. Preferably, but not necessarily, the workpiece is a segment of a vegetable or a fruit, for example a lemon or a lime. As used throughout this specification and in the claims the term "workpiece" is understood to mean a segment, section, wedge or portion of the starting fruit or vegetable. For example, a lime and a segment or wedge of a lime constitutes a workpiece. Apparatus 15 is specifically useful in moving a relatively larger or wider workpiece through a relatively smaller or narrower opening, for example moving a segment of a lime through an opening in a beverage bottle or can.

As shown in FIG. 1, apparatus 15 has a loader 20 having a base portion 22 that is mountable over the opening in the container. Preferably, but not necessarily, base portion 22 forms a cavity 24 positionable around a neck portion of the container which forms the opening. Preferably, a lip surface 26 is formed at a first end portion of cavity 24. When loader 20 is mounted on the container, lip surface 26 contacts a surface of the neck portion surrounding a periphery of the opening.

Loader 20 forms a bore 28 which extends through at least a portion of loader 20. Preferably, bore 28 is coaxially aligned with cavity 24. Preferably, bore 28 is tapered to have a frusto-conical shape and a circular cross-sectional area. However, bore 28 may have any suitable shape and/or cross-section known to those having ordinary skill in the art, for example bore 28 may be cylindrical.

As shown in FIG. 2, apparatus 15 further has a plunger 40 having an extension portion 42, which preferably, but not necessarily, has a length which is longer than a length of bore 28. Preferably, extension portion 42 is slidably movable within bore 28. In one preferred embodiment, extension portion 42 is tapered as shown in FIGS. 2 and 3. Tapered extension portion 42 is easily slidably movable within correspondingly tapered bore 28.

Plunger 40 is moveable between a first position wherein extension portion 42 is not positioned within bore 28 and a second position wherein extension portion 42 is slidably movable within bore 28. With plunger 40 in the first position, a workpiece can be position within bore 28. Plunger 40 is then slidably moveable to the second position, as shown in FIG. 3, whereby extension portion 42 of plunger 40 is coaxially aligned with bore 28. An end portion 43 of extension portion 42 contacts the workpiece and the workpiece is plunged through bore 28 and through the opening in the container. In the second position, end portion 43 of extension portion 42 extends beyond bore 28, as shown in FIG. 3, and into the opening in the container to ensure that the workpiece is moved through the opening and into the container. Thus, end portion 43 prevents the opening from being closed or blocked by the workpiece. As the workpiece is plunged through tapered bore 28, the workpiece is gradually compressed between an outer surface 29 of extension portion 42 and an inner surface 30 of bore 28, thereby reducing the size of the workpiece and allowing the relatively wider workpiece to move through the opening.

In the second position, as shown in FIG. 3, a first contact surface 44 of plunger 40 contacts a second contact surface 32 of loader 20, to prevent further movement of extension portion 42 within bore 28.

Figure 5:
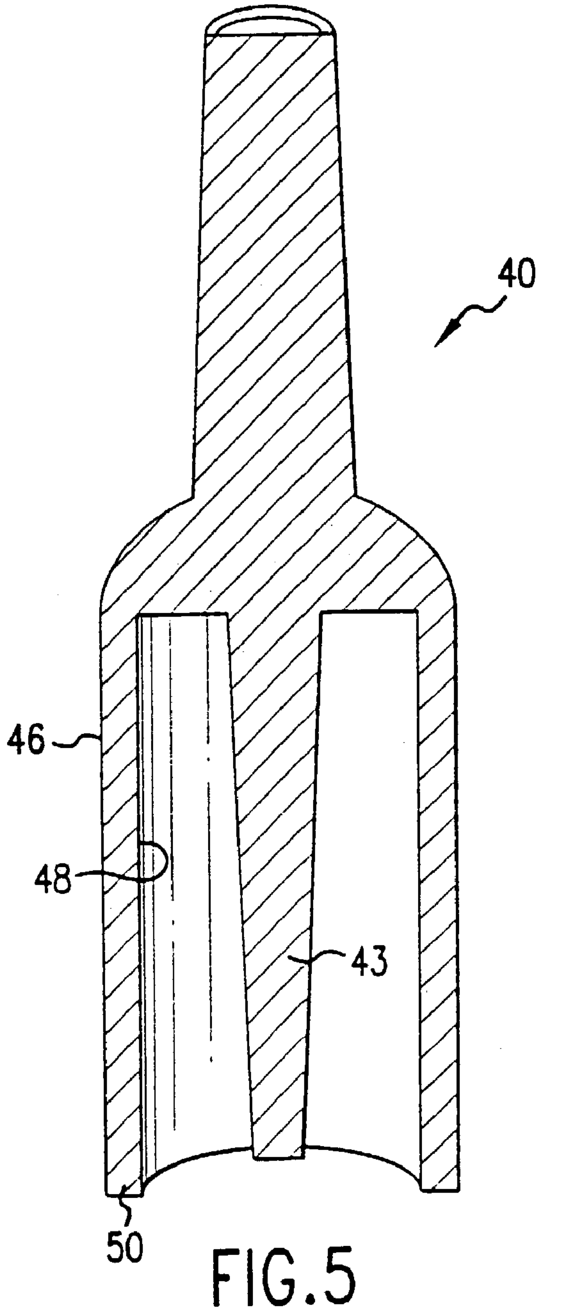
FIG. 5 is a perspective cross-sectional view of a plunger, according to one preferred embodiment of this invention.
Figure 6:
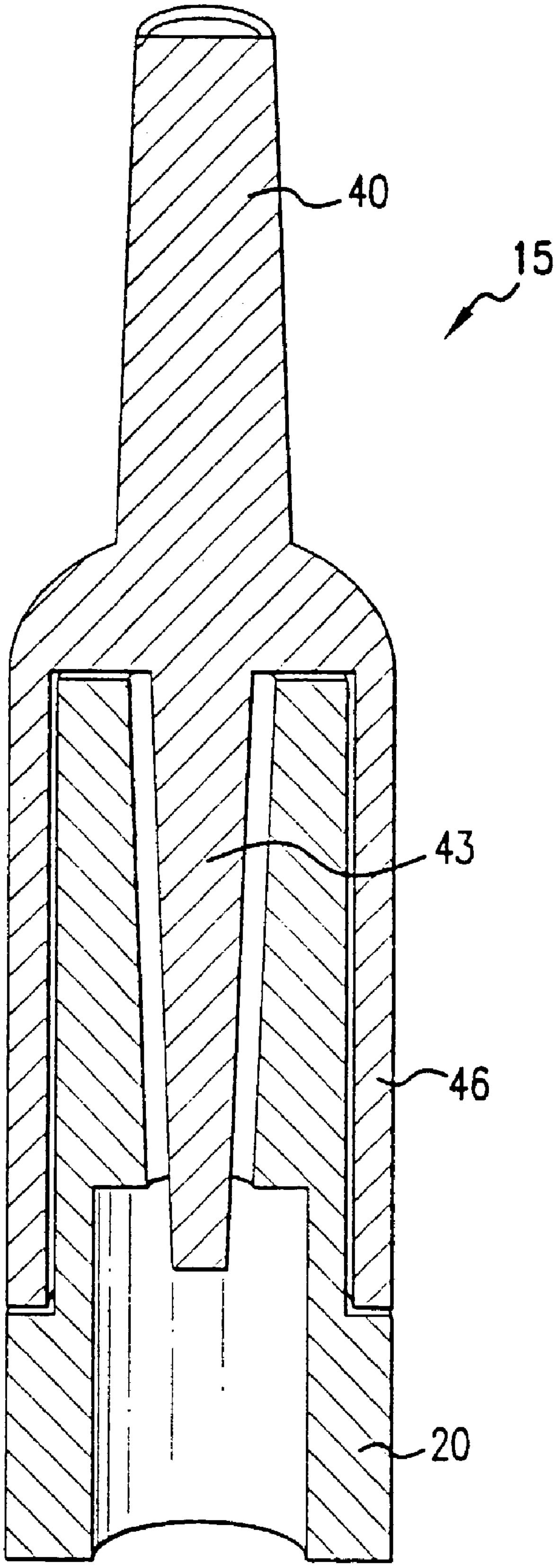
FIG. 6 is a perspective cross-sectional view of a plunger slidably positioned within the loader, according to one preferred embodiment of this invention.

In one preferred embodiment of this invention, as shown in FIGS. 5 and 6, plunger 40 has a guide 46 for plunger 40. Preferably, but not necessarily, guide 46 is continuous, extending around a periphery of loader 20. An inner surface 48 of guide 46 slidably engages an outer surface 34 of loader 20. Guide 46 may have a plurality of guide sections. Guide 46 is positioned around outer surface 34 to align extension portion 42 with bore 28 as the workpiece is plunged through bore 28 and the opening. In one preferred embodiment of this invention, an end surface 50 of guide 46 contacts a ledge or step 36 formed by outer surface 34 of loader 20. Preferably, but not necessarily, in the second position, loader 20 and plunger 40 are positioned together to form bottle-shaped apparatus 15, as shown in FIGS. 3 and 6.

In one preferred embodiment of this invention, as shown in FIGS. 7–11, an apparatus 115 for narrowing and moving the workpiece through an opening in the container has a base 116. Base 116 provides support for apparatus 115 and is preferably placed on a generally horizontal surface, for example on a restaurant bar. Preferably, but not necessarily, base 116 has a generally arcuate-shaped stop or wall segment 117. Wall segment 117 may have any suitable shape. Wall segment 117 accepts a base portion of the container and positions the container properly during the operation of apparatus 115. Preferably, a post 118 is fixedly connected to base 116 in a perpendicular direction.

Figure 7:
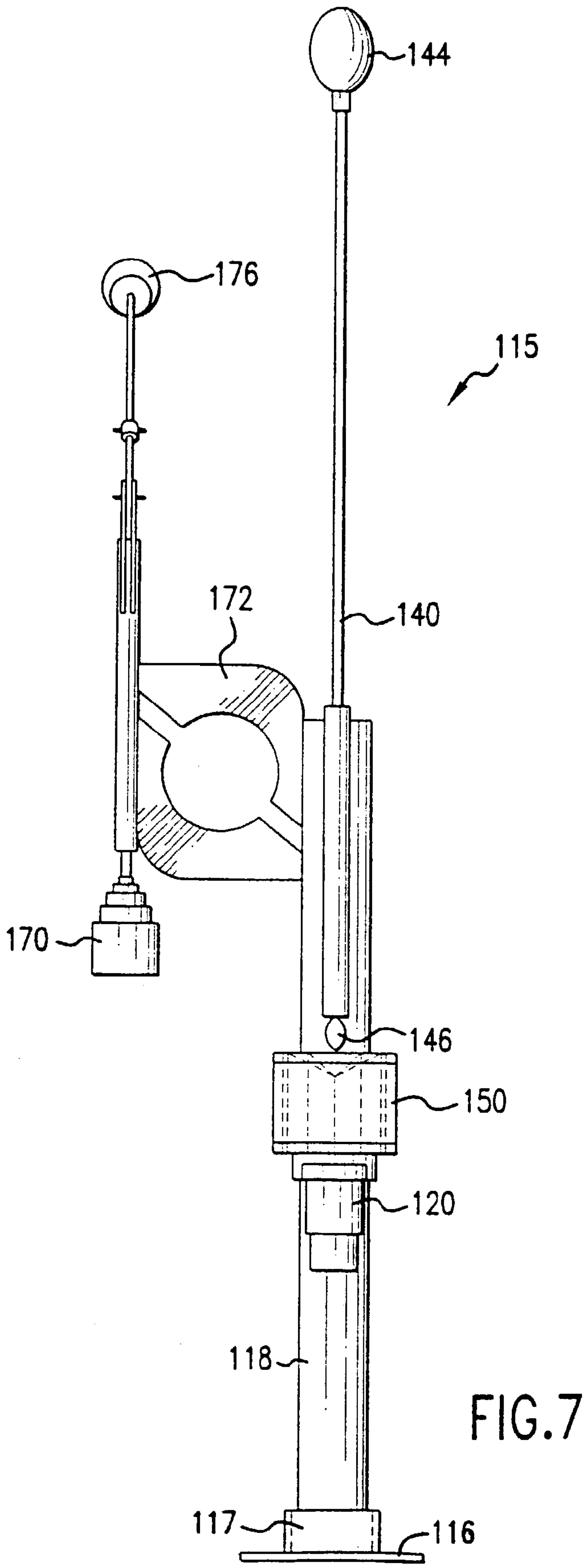
FIG. 7 is a front view of an apparatus for preparing a workpiece and moving the workpiece through an opening in a container, according to one preferred embodiment of this invention.
Figure 8:
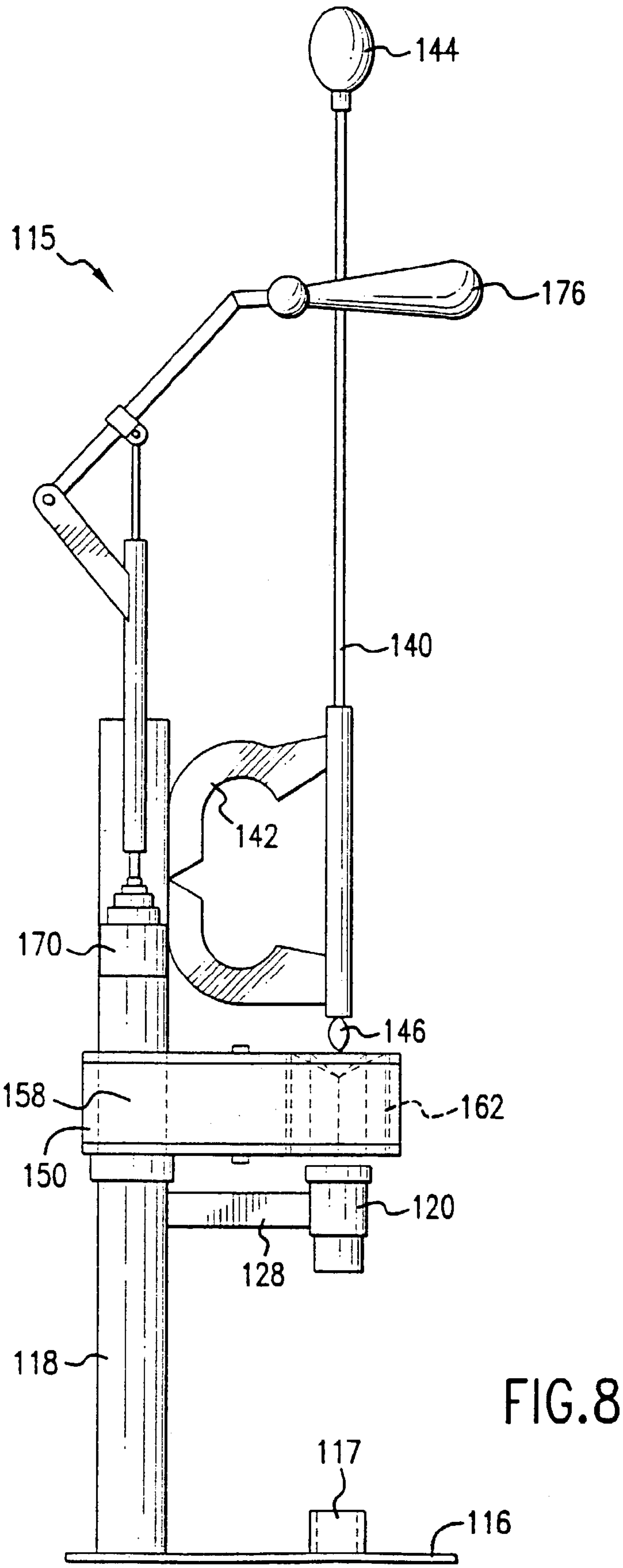
FIG. 8 is a side view of an apparatus for preparing a workpiece and moving the workpiece through an opening in a container, according to one preferred embodiment of this invention.
Figure 10:
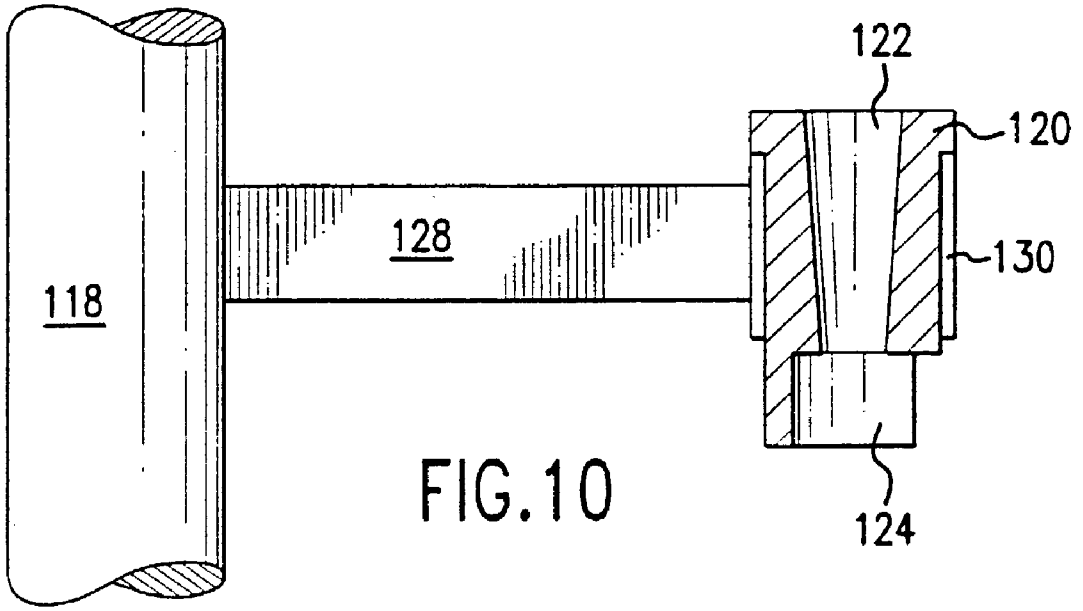
FIG. 10 is a partial cross-sectional view of a loader mounted to a post, according to one preferred embodiment of this invention.

As shown in FIGS. 7 and 8, apparatus 115 has a loader 120 mounted to post 118. Preferably, but not necessarily, loader 120 is mounted to post 118 with a support arm 128. As shown in FIG. 10, loader 120 is removably positioned in a cylindrical aperture or ring 130 of support arm 128. Ring 130 supports loader 120 during operation of apparatus 115 and allows loader 120 to be removed for easy cleaning and/or replacement.

Loader 120 forms a first bore 122 which extends through at least a portion of loader 120, as shown in FIG. 10. Preferably, first bore 122 is tapered to have a frusto-conical shape and a circular cross-sectional area. However, first bore 122, may have any suitable shape and/or cross-section known to those having ordinary skill in the art, for example a cylindrical shape or a triangular cross-section.

As shown in FIG. 10, loader 120 preferably, but not necessarily, has a base portion 124 for accepting a neck portion of the container, for example a beverage bottle, and aligning or positioning the opening formed in the neck portion underneath first bore 122. Preferably, but not necessarily, base portion 124 has an arcuate shape corresponding to the neck portion of the container. Wall segment 117 of base 116 and base portion 124 of loader 120 ensure proper alignment of the opening in the container with first bore 122.

As shown in FIGS. 7 and 8, apparatus 115 has a plunger 140 mounted to post 118. Preferably, but not necessarily, plunger 140 is mounted to post 118 with a support frame 142. Support frame 142 can have any shape and/or design that is suitable to withstand the pressure applied to plunger 140 and post 118 during the plunging of the workpiece, as discussed below. Plunger 140 is moveable in a generally vertical direction. Handle portion 144 is used to move plunger 140 in a downward or upward direction. Plunger 140 is aligned coaxially with first bore 122, so that as plunger 140 is moved in a downward direction using handle portion 144, a plunger head 146 moves through and extends beyond first bore 122.

Figure 9:
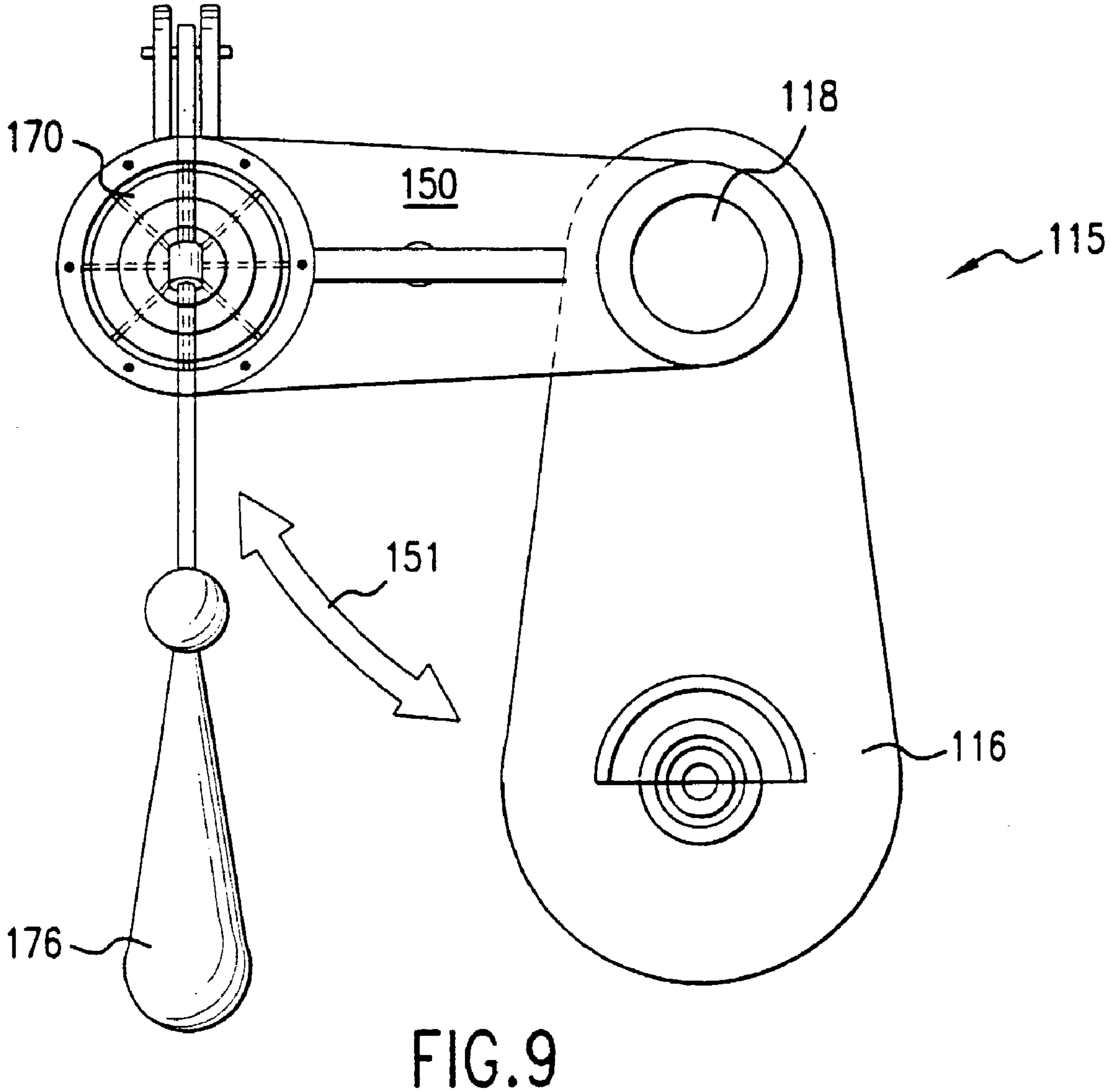
FIG. 9 is a top view of an apparatus for preparing a workpiece and moving the workpiece through an opening in a container, according to one preferred embodiment of this invention.

As shown in FIGS. 7–9, a support plate 150 is rotatably connected to post 118 and forms a second bore 152. As shown by direction arrows 151 in FIG. 9, support plate 150 is rotatable between a first position wherein second bore 152 is coaxially aligned with a compression piece 170 and a second position wherein second bore 152 is coaxially aligned with and positioned between plunger 140 and loader 120. Preferably, but not necessarily, support plate 150 has a lock-plunger 158 to lock support plate 150 in the first position or the second position.

Figure 11:
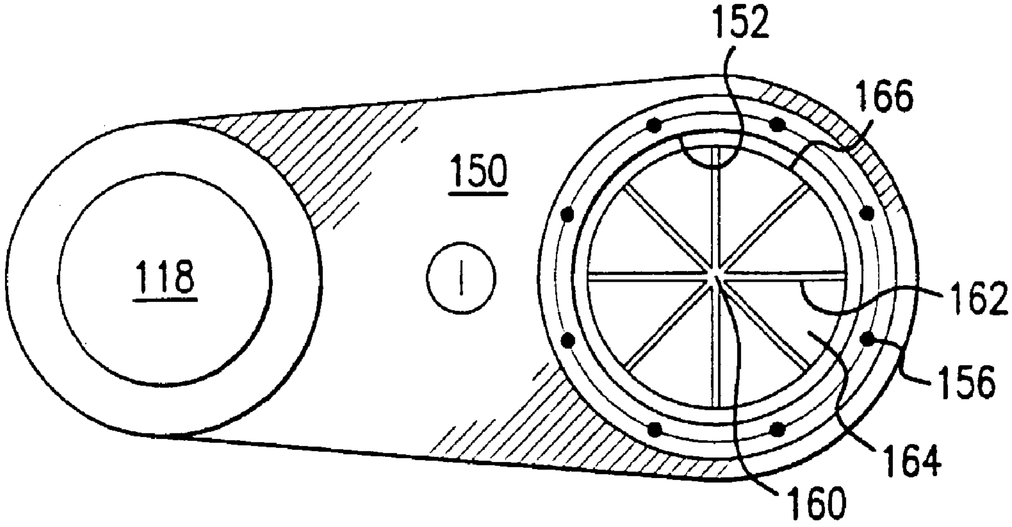
FIG. 11 is a top view of a support plate having a slicer with a plurality of radially-positioned blades, according to one preferred embodiment of this invention.

As shown in FIG. 11, a slicer 160 is rotatably positionable within second bore 152. Slicer 160 is removable from within second bore 152 for easy cleaning, maintenance and/or replacement. Slicer 160 includes a plurality of blades 162 positioned radially within slicer 160 to form compartments or sections 164. Blades 162 may be any suitable conventional blade used for slicing or cutting vegetables and fruit into wedges (i.e. workpieces). Preferably, but not necessarily, blades 162 have an angled cutting surface to provide support to the fruit or vegetable during the cutting or slicing process, as shown in FIG. 8.

In one preferred embodiment of this invention, blades 162 are fixedly positioned within a cylinder 166, as shown in FIG. 11. Cylinder 166 is rotatably positionable within second bore 152 and provides for easy rotation of slicer 160 with respect to second bore 152. Preferably, but not necessarily, support plate 150 has a plurality of indicators 156 positioned around a periphery of second bore 152, corresponding to each section 164 created by blades 162. Indicators 156 index the location of a workpiece held within a section 164 of slicer 160. Each section 164 can be aligned with plunger 140 and first bore 122 to hold and position the workpiece in alignment with plunger 140 and first bore 122.

In one preferred embodiment of this invention, as shown in FIGS. 7–9, apparatus 115 further has compression piece 170 mounted to post 118. Preferably, but not necessarily, compression piece 170 is mounted to post 118 with a support frame 172. Support frame 172 can have any shape and/or design that is suitable to withstand the pressure applied to compression piece 170 and post 118 during the compression of a workpiece, as discussed below.

Compression piece 170 is radially offset with respect to post 118 from loader 120 and plunger 140. Compression piece 170 is adapted to move in a vertical direction. In one preferred embodiment, a handle 176 is pivotally connected to compression piece 170. Handle 176 pivots to move compression piece 170 in a downward direction towards second bore 152 to compress the whole vegetable or fruit into slicer 160. Preferably, compression piece 170 has an inner surface (not shown) corresponding generally to the shape of the vegetable or fruit to tightly hold it. By moving compression piece 170 towards slicer 160, the vegetable or fruit is compressed into slicer 160 and sliced or cut by blades 162 into a plurality of wedges or segments (workpieces). Compression piece 170 may have other shapes, for example compression piece 170 may have a generally flat surface.

Referring to FIGS. 7–11, a method for preparing and moving a relatively larger or wider workpiece through a relatively smaller or narrower opening in a container begins with positioning support plate 150 between plunger 140 and loader 120. Slicer 160 is positioned within second bore 152 and contains a workpiece in at least one section 164. Section 164 holding or retaining the workpiece is aligned with plunger 140 and first bore 122 of loader 120 with reference to indicator 156 corresponding to section 164 holding the workpiece.

With the workpiece aligned with first bore 122, handle portion 144 of plunger 140 is moved in a downward direction to move plunger 140 towards support plate 150. Plunger head 146 contacts the workpiece. As plunger 140 continues to move in a downward direction, the workpiece is pushed or moved by plunger head 146 out of section 164 and into first bore 122 formed in loader 140.

As the workpiece is plunged through first bore 122, the workpiece is compressively narrowed as a result of the frusto-conical shape of first bore 122. Plunger head 146 continues to narrow and move the workpiece through first bore 122 and into the opening formed in the container until the workpiece is moved through the opening and into the container. Plunger head 146 protrudes into the opening to ensure that the workpiece does not get stuck within the neck portion thereby restricting the flow of beverage through the neck portion.

In one preferred embodiment of this invention, as shown in FIGS. 7–11, the method for preparing and moving the relatively wider workpiece through the opening further includes the following steps before support plate 150 is positioned between plunger 140 and loader 120.

With support plate 150 aligned in the first position with compression piece 170, the vegetable or fruit is placed onto or over slicer 160 positioned within second bore 152. Handle 176 pivots to move compression piece 170 in a downward direction towards slicer 160 to compress the vegetable or fruit into slicer 160, whereby the vegetable or fruit is sliced or cut by blades 162 to form workpieces which are held or retained in sections 164 of slicer 160.

With each section 164 holding a workpiece, support plate 150 is rotated to the second position and preferably, but not necessarily, locked in the second position with lock-plunger 158, wherein support plate 150 is positioned between plunger 140 and loader 120. The plunging process then continues wherein the workpiece is plunged from section 164, through first bore 122 and through the opening into the container.

After removing the container from under first bore 122, a second container can then be placed under first bore 122. Slicer 160 is rotated with respect to second bore 152 so that a second section 164 holding a workpiece is aligned with plunger 140 and first bore 122. This process can be repeated until each workpiece is plunged from corresponding section 164. Support plate 150 is then rotated to the first position to compress a second workpiece into slicer 160.

While the embodiments of the invention described herein are presently considered preferred, various modifications and improvements can be made without departing from the spirit and scope of the invention. The scope of the invention is indicated by the appended claims, and all changes that fall within the meaning and range of equivalents are intended to be embraced therein.

What is claimed is:

1. A method for inserting at least a portion of a fruit or vegetable food product into a non-edible beverage container having an opening relatively smaller than the at least a portion of food, the method comprising the steps of:

providing a loader and a cooperating plunger, the loader defining a bore capable of receiving at least a portion of food and the plunger capable of moving the at least a portion of food relative to the loader;

providing a non-edible beverage container having an interior chamber for holding a beverage and an opening into the chamber;

loading the at least a portion of food into the bore of the loader;

mounting the loader over the opening of the non-edible beverage container; and plunging the at least a portion of food through the bore with the plunger to compress and move the at least a portion of food relative to the loader and into the non-edible beverage container through the opening thereof.

2. The method of claim 1 wherein the mounting step comprises mounting the loader to a neck portion of the container forming the opening thereof.

3. The method of claim 1 wherein the loader defines a cavity communicating with the bore and capable of receiving the opening of the container and the method further comprises inserting the opening of the container into the cavity of the loader so that the bore of the loader is aligned with the opening of the container for inserting the at least a portion of food into the container.

4. The method of claim 1 wherein the plunger includes an extension portion and a handle portion, the extension portion cooperates with the bore of the loader and the plunging step further comprises moving the plunger between a first position wherein at least a majority of the extension portion of the plunger is removed from the bore and a second position wherein the majority of the extension portion is positioned within the bore.

5. The method of claim 4 wherein moving the plunger between the first and second positions further comprises extending at least a portion of the extension portion beyond a bottom surface of the loader in order to insert the at least a portion of food into the container.

6. The method of claim 1 wherein the plunger includes an extension portion and a handle portion, the extension portion cooperates with the bore of the loader and plunging the at least a portion of food further comprises slidably moving the extension portion of the plunger within the bore in order to insert the at least a portion of food through the opening of the container.

7. The method of claim 6 wherein slidably moving the extension portion of the plunger further comprises compressing the at least a portion of food between the extension portion and the bore as the at least a portion of food moves through the loader.

8. The method of claim 6 wherein the extension portion is generally frusto-conical in shape and the bore has a generally complementary frusto-conical shape and slidably moving the extension portion of the plunger further comprises compressing the at least a portion of food between the extension portion and the bore as the at least a portion of food moves through the loader.

9. The method of claim 6 wherein the extension portion has an outer surface and is longer than the bore and the bore has an inner surface and an end and the method further comprises coaxially aligning the extension portion with the bore and sliding the extension portion through the bore so that the outer surface of the extension portion is guided by the inner surface of the bore and an end of the extension portion extends beyond the end of the bore.

10. The method of claim 6 further comprising the step of positioning the loader and the plunger together so that the loader and plunger form a bottle-shape with a generally round upstanding wall with a neck portion of reduced diameter extending therefrom.

11. The method of claim 1 wherein plunging the at least a portion of food through the bore further comprises compressing the food to insert at least a portion thereof into the beverage container.

12. A method for moving a relatively larger workpiece from a fruit or a vegetable through a relatively smaller opening in a beverage container comprising the steps of:

providing a beverage container having an interior chamber for holding a beverage and an opening into the chamber;

positioning a plunger having an extension portion with respect to a bore formed in a loader positioned over the opening in the beverage container;

moving the workpiece through the bore to compress the workpiece; and plunging the workpiece through the opening, whereby a portion of the extension portion extends through the opening and into the beverage container.

13. The method of claim 12 wherein the extension portion has a frusto-conical shape and the bore has a generally complementary frusto-conical shape and the method further comprises compressing the workpiece between the frusto-conical extension portion and the frusto-conical bore as the workpiece moves through the loader.

14. The method of claim 12 further comprising loading the workpiece into the loader before positioning the plunger with respect to the bore.

15. The method of claim 12 wherein the workpiece comprises one of a lemon segment and a lime segment and plunging the workpiece comprises driving the lemon or lime segment through the opening and into the container.

16. The method of claim 15 wherein driving the lemon or lime segment through the opening further comprises compressing the segment to insert at least a portion thereof into the container.

17. A method for inserting a lime wedge into a beverage bottle comprising the steps of:

providing a beverage bottle having an interior chamber for holding a beverage and a neck portion defining an opening into the chamber;

mounting a base portion of a loader on the neck portion of the beverage bottle to position a bore formed in the loader having a frusto-conical shape with an opening in the beverage bottle;

loading the lime wedge in the loader;

aligning a plunger having a tapered extension portion with the bore;

slidably moving the plunger within the bore to compressively move the lime wedge through the loader; and plunging the lime wedge through the opening and into the beverage bottle.

18. The method of claim 17 further comprising compressing the lime wedge to insert at least a portion thereof into the beverage bottle.

19. The method of claim 17 wherein the beverage bottle comprises a long-neck beer bottle and the method further comprises combining the loader and plunger to form a shape similar to the long neck beer bottle shape of the beverage bottle.

20. A method for inserting at least a portion of a fruit or vegetable food product into a beverage container, the method comprising:

providing a beverage container having an interior chamber for holding a beverage and an opening into the chamber;

providing a loader having an upper portion and a lower portion, the upper portion being capable of holding at least a portion of food and having at least one surface for compressing and guiding the at least a portion of food into the beverage container, and the lower portion defining a bore being capable of receiving the beverage container at the beverage container opening to mount the loader thereon;

providing an elongated plunger having a handle portion and a drive portion, the drive portion being capable of extending through the upper portion of the loader to engage and drive the at least a portion of food from the upper portion into the interior chamber of the beverage container through the opening in the beverage container;

positioning at least a portion of the beverage container at the beverage container opening in the lower portion of the loader;

inserting the at least a portion of food into the upper portion of the loader; and driving the at least a portion of food into the chamber of the beverage container using the plunger.

21. The method of claim 20 wherein driving the at least a portion of food into the chamber comprises moving the plunger between a first position wherein at least a majority of the drive portion is removed from the upper portion and a second position wherein at least a majority of the drive portion is positioned within the upper portion such that an outer surface of the drive portion engages and drives the at least a portion of food.

22. The method of claim 20 wherein the drive portion of the plunger is longer than the upper portion of the loader and driving the at least a portion of food into the chamber comprises driving the drive portion of the plunger through the upper portion of the loader and into at least one of the lower portion of the loader and the beverage container.

23. The method of claim 20, wherein the drive portion of the plunger is tapered and the upper portion of the loader has a frusto-conical shape corresponding to the tapered drive portion and driving the at least a portion of food into the chamber comprises driving the plunger into the upper portion of the loader such that an outer surface of the drive portion contacts an inner surface of the loader and the drive portion drives the at least a portion of food into the interior chamber of the beverage container.

24. The method of claim 20, wherein the bore defined by the lower portion of the loader is recessed into a lower surface of the loader and positioning at least a portion of the beverage container at the beverage container opening in the lower portion of the loader comprises inserting the opening of the beverage container into the recess of the lower portion of the loader.

25. The method of claim 20, further comprising compressing the at least a portion of food between the loader and plunger as the at least a portion of food moves through the loader.

26. The method of claim 20, wherein the method further comprises inserting the plunger into the loader to form a long neck bottle shape which can resemble the shape of the beverage container into which the at least a portion of food is inserted.

27. A method for inserting at least a portion of a fruit or vegetable food product into a beverage container, the method comprising:

providing a beverage container having an interior chamber for holding a beverage and an opening into the chamber;

providing a loader having an upper portion and a lower portion, the upper portion being capable of holding the at least a portion of food and having at least one surface for compressing and guiding the at least a portion of food into the beverage container, and the lower portion defining a cavity being capable of receiving at least a portion of the beverage container at the opening thereof to mount the loader thereon;

providing an elongated plunger having integral handle and drive portions, the drive portion being capable of extending through the upper portion of the loader to engage and drive the at least a portion of food from the upper portion into the interior chamber of the beverage container through the opening in the beverage container when the plunger is moved from a loading position wherein the drive portion is substantially removed from the loader to an inserting position wherein the drive portion is inserted fully within the loader; and driving at least a portion of the plunger into the loader to insert the at least a portion of food into the beverage container.

28. The method of claim 27 wherein the drive portion and the loader have complimentary outer and inner sloped surfaces, respectively, which are capable of engaging one another when the plunger is moved between the loading and inserting position and the method further comprises combining the plunger and loader to form a long neck bottle shape having a generally round upstanding wall portion with an elongated neck portion of smaller diameter extending therefrom.

29. The method of claim 27 wherein at least a majority of the drive portion is removed from the upper portion when the plunger is in the loading position, and at least a majority of the drive portion is positioned within the upper portion of the loader and at least partially within the lower portion of the loader when the plunger is in the inserting position such that an outer sloped surface of the drive portion extends along a complimentary inner sloped surface of the upper portion, and driving at least a portion of the plunger into the loader comprises aligning the plunger with the upper portion of the loader and inserting at least a portion of the drive portion into the upper portion of the loader to drive the at least a portion of food into the beverage container.

* * * * *